US010864762B2

(12) United States Patent
Bleiman et al.

(10) Patent No.: US 10,864,762 B2
(45) Date of Patent: Dec. 15, 2020

(54) ANTI-HARVESTABLE SECURITY FEATURE

(71) Applicant: Visual Physics, LLC, Alpharetta, GA (US)

(72) Inventors: Benjamin E. Bleiman, Cumming, GA (US); Jonathan D. Gosnell, Cumming, GA (US)

(73) Assignee: Visual Physics, LLC, Alpharetta, GA (US)

(*) Notice: Subject to any disclaimer, the term of this patent is extended or adjusted under 35 U.S.C. 154(b) by 94 days.

(21) Appl. No.: 16/326,149

(22) PCT Filed: Aug. 15, 2017

(86) PCT No.: PCT/US2017/046955
§ 371 (c)(1),
(2) Date: Feb. 15, 2019

(87) PCT Pub. No.: WO2018/035126
PCT Pub. Date: Feb. 22, 2018

(65) Prior Publication Data

US 2019/0184731 A1 Jun. 20, 2019

Related U.S. Application Data

(60) Provisional application No. 62/374,961, filed on Aug. 15, 2016.

(51) Int. Cl.
*G02B 27/10* (2006.01)
*B42D 25/324* (2014.01)
(Continued)

(52) U.S. Cl.
CPC ........... *B42D 25/324* (2014.10); *B41M 3/148* (2013.01); *B42D 25/351* (2014.10); *B42D 25/36* (2014.10); *B41M 3/06* (2013.01)

(58) Field of Classification Search
CPC .................................................... B42D 25/324
(Continued)

(56) References Cited

U.S. PATENT DOCUMENTS 1,942,841 A 1/1934 Shimizu
2005/0247794 A1 11/2005 Jones et al.
(Continued)

FOREIGN PATENT DOCUMENTS

DE 9306671 U1 7/1993
EP 1538554 A2 6/2005
(Continued)

OTHER PUBLICATIONS

Communication pursuant to Rules 161(1) and 162 EPC dated Mar. 27, 2019 in connection with European Patent Application No. 17758697.1, 4 pages.
(Continued)

*Primary Examiner* — James C. Jones

(57) ABSTRACT

A security device includes an array of image icon elements and an array of image icon focusing elements, wherein the array of image icon elements and the array of image icon focusing elements are disposed relative to each other such that the security device projects a synthetic image along a viewing angle and wherein the security device is configured to physically degrade when exposed to temperatures above an anti-harvesting temperature, the anti-harvesting temperature being lower than a harvesting temperature of a coupling between the security device and a substrate.

32 Claims, 1 Drawing Sheet

(51) Int. Cl.

| | |
|---|---|
| ***B41M 3/14*** | (2006.01) |
| ***B42D 25/36*** | (2014.01) |
| ***B42D 25/351*** | (2014.01) |
| *B41M 3/06* | (2006.01) |

(58) Field of Classification Search
USPC .......................................................... 359/619
See application file for complete search history.

(56) References Cited

U.S. PATENT DOCUMENTS

| | | | | |
|---|---|---|---|---|
| 2011/0019283 A1* | 1/2011 | Steenblik | G09F 3/0376 359/622 |
| 2011/0045255 A1 | 2/2011 | Jones et al. | |

FOREIGN PATENT DOCUMENTS

| | | | |
|---|---|---|---|
| FR | 2689670 | A1 | 10/1993 |
| JP | 2003-186402 | A | 7/2003 |
| JP | 2005-274627 | A | 10/2005 |

OTHER PUBLICATIONS

Decision on Grant and Results of Examination in connection with Russian Application No. 2019107344/12(014066) dated Aug. 30, 2019, 23 pages.
IP Australia, "Examination report No. 1 for standard patent application," Application No. AU 2017313044, dated Nov. 30, 2019, 3 pages.
IB, "International Preliminary Report on Patentability," International Application No. PCT/US2017/046955, dated Feb. 19, 2019, 8 pages.
Examination Search Report in connection with Canadian Application No. 3,033,868 dated Apr. 22, 2020, 4 pages.
First Office Action in connection with Chinese Application No. 201780063573.0 dated Apr. 24, 2020, 21 pages.
Examination report in connection with Indian Application No. 201927005707 dated Jun. 23, 2020, 6 pages.
Notice of Reasons for Refusal in connection with Japanese Application No. 2019-508962 dated Jun. 2, 2020, 8 pages.
International Search Report dated Nov. 17, 2017 in connection with International Patent Application No. PCT/US2017/046955, 2 pages.
Notification of Reason for Refusal in connection with Korean Application No. 10-2019-7007434 dated Jul. 23, 2020, 21 pages.

* cited by examiner

ANTI-HARVESTABLE SECURITY FEATURE

CROSS-REFERENCE TO RELATED APPLICATIONS

This application is a 371 National Stage of International Application No. PCT/US2017/046955, filed Aug. 15, 2017, which claims priority to U.S. Provisional Patent Application No. 62/374,961, filed Aug. 15, 2016, the disclosures of which are herein incorporated by reference in their entirety.

TECHNICAL FIELD

The present invention generally relates to a security feature (e.g., a security device or security label) suitable for use in authenticating a product to which it is attached or for applying an aesthetic effect to a product to which it is attached. The security feature comprises a component which reduces or prevents harvesting of the security feature from an authentic product for repurposing, such as for use on other product(s) that are counterfeited. As such, the present invention provides an anti-harvestable security feature.

BACKGROUND

Security devices are supplied to the secure documents market and the secure consumer products market for use as security features. For example, security devices are affixed directly to the secure documents or consumer products or packaging for said products or are used to form a security label, which can then be affixed to a product. When these security features are affixed to documents or products in the market they can generally be suitable for authenticating the source of the products (as used herein, the term "product" includes, but is not limited to, secure documents and secure products). These security features are able to provide source identity and authenticity because they produce unique stationary and/or mobile effects that are very difficult to replicate. Accordingly, product consumers can rely on the presence of these affixed security features as confirmation that the products they are using/purchasing are authentic and are not counterfeited. These security features therefore function as anti-counterfeiting security features; though they may alternatively or additionally be used for imparting particular aesthetic effects to the product to which they are affixed.

Ironically, some security features, due in part to the effectiveness of the security devices as anti-counterfeiting security features, have been targeted for "harvesting". As used herein, "harvesting" refers to the extraction of the affixed security feature or portions thereof from an associated authentic product and subsequently affixing the extracted security feature onto a counterfeited product.

Counterfeiters employ various harvesting techniques in order to remove the security feature. In most cases, though not all, the counterfeiters' objective is to remove the security feature from the authentic product in such a way that it can be affixed to a counterfeited product in a substantially identical way as it would have been affixed to an authentic product. In other words, it is most beneficial to the counterfeiter if the security feature can be harvested without damage or deformity to the feature so that it may be applied to a counterfeit product without the consumer recognizing any distinction between the authentic product and the counterfeited product.

Among the numerous harvesting techniques employed by counterfeiters, thermal harvesting is quite common, though not exhaustive. As used herein, the term "thermal harvesting" refers to the application of heat to a security feature in order to weaken the strength of coupling means or elements used to affix the security feature to the product. For example, heat can be applied to a security label in order to weaken the strength of an adhesive used to affix the label to the product or to a security device in order to weaken the strength of an adhesive used to affix the security device to a label substrate or to a product. Thermal harvesting can, for example, be accomplished by extracting the security device or label from its associated authentic product by applying heat through a heat gun, hot plate or similar means, etc. Once again, the efficiency of the security device serves as motivation for such targeting by counterfeiters. Namely, the security device is very much relatively thermally insensitive compared to the coupling means. By contrast, the adhesive used to affix the security device to the label substrate, or the label to the product, is relatively very thermally sensitive. This combination of relatively high thermal insensitivity in the security device or label and relatively high thermal sensitivity in the adhesive allows counterfeiters to easily harvest the security device or label by, for example, weakening the adhesive and peeling off or delaminating the label or security device from the associated product. Application of heat to the label or to the device causes the adhesive's adhesive strength to deteriorate and thereby allows the easy removal of the security label or device from the authentic product intact or at least in a form suitable for affixing to a counterfeited product.

Accordingly, there heretofore existed a need for a security feature (e.g., security device or security label) that can be used for authenticating a product, or for adding aesthetic effect to the product, while being resistant to harvesting.

SUMMARY

Through arduous experimentation and high level expertise, Applicant has invented a solution to the above discussed problem and herein discloses said solution in compliance with the requirements for grant of an application for a patent on the invented solution. While several embodiments are disclosed herein, these embodiments are not intended to limit the scope of the invention and the claims sought herein. The embodiments are presented such that one of ordinary skill in the art will be able to understand what Applicant claims as the invention and to enable one of ordinary skill in the art to practice the claimed invention without need for undue experimentation.

DETAILED DESCRIPTION

Figure 1:
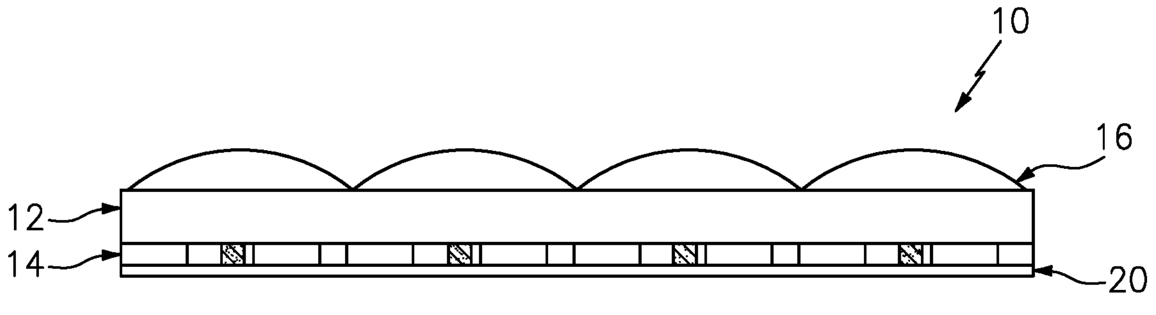
FIG. 1 is a cross-section of one embodiment of the security device of the present invention, where the anti-harvesting component is integrated as either the optical spacer or the adhesive layer.

"Anti-harvesting temperature", as used herein, refers to a temperature at and/or above which the security feature—when exposed to such temperatures—will become observably deformed.

"Anti-harvesting component", as used herein, refers to a component of the security feature, which is responsible for the deformation of the security feature, when the feature or product to which it is attached, is subjected to temperatures above the anti-harvesting temperature.

"First coupling means", or "first means of coupling", as used herein shall refer to the means of coupling a security device to a product substrate.

"Harvesting temperature", as used herein, refers to a temperature at and/or above which the capacity of the coupling means—to couple the security device to a label substrate or a product substrate, or to couple a security label to a product substrate—becomes degraded when the security device, label or product having the security device or security label affixed thereto, is exposed to such temperatures.

"Second coupling means", or "second means of coupling", as used herein, shall refer to the means of coupling a security device to a label substrate or the otherwise indirect coupling of the security device to a product substrate.

"Security feature", as used herein, shall refer to either the security device separately or the security label, which contains the security device.

One aspect of the invention provides a security feature for authenticating or adding an aesthetic feature to a product (e.g., secure document or secure product). The security feature is characterized in that it has a selected anti-harvesting temperature such that when the security feature is coupled to a product substrate by at least one coupling means, the anti-harvesting temperature is lower than the harvesting temperature of at least one of the coupling means. Coupling means as used herein refers to structural features that function to interlock, affix, or otherwise attach components of a security device to a label substrate or to a product substrate or for interlocking, affixing or otherwise attaching a security label to a product substrate. Coupling means as used herein shall include one or more structural features such as at least one of adhesives, mechanical interlocks, chemical reaction between interfaced components and equivalents thereof.

In one embodiment the security feature is a security device comprising an array of image icon elements and an array of image icon focusing elements. The device is characterized in that it has a selected anti-harvesting temperature such that when the security device is coupled to a product substrate by a first coupling means, or to a label substrate by a second coupling means, the anti-harvesting temperature is lower than the harvesting temperature of the first and/or second coupling means. Alternatively, the device is coupled to the product substrate by a first coupling means or element, or to a label substrate by a second coupling means or element. The array of image icon elements and the array of image icon focusing elements are disposed relative to each other such that the security device projects at least one synthetic image when the array of image icon elements is viewed directly or through the array of image icon focusing elements.

In one embodiment, the coupling means or coupling elements are selected to provide at least one of mechanical or chemical interaction to provide a fastening or, alternatively, a locking together or lamination of components of the security feature or the security feature to a product substrate. In one embodiment, the first coupling means is an adhesive. The first coupling means adhesive may be the same or different from any other coupling means. Adhesives suitable for use as a first or second coupling means, include, but are not limited to, pressure sensitive adhesives, hot melt, heat sealed, and the like.

In one embodiment, the anti-harvesting temperature is attributable and is therefore determined by the presence of at least one anti-harvesting component or set of components of the security feature. In a preferred embodiment, the anti-harvesting component is integrated with the security device such that it is within the circumferential boundaries of the security device or it forms at least one circumferential boundary of the security device. As such the anti-harvesting component, may be an exposed layer of the security device or it can be interposed between layers of the security device forming its own distinct layer of forming an interface between multiple layers. Contemplated anti-harvesting components are those components of the security feature that react to the stress of a particular harvesting technique differently than how at least one coupling means/element react to the harvesting technique. In a particular embodiment, the anti-harvesting component includes layers of the security feature, interfaces between layers of the security feature, or portions of the layers of the security features, or combinations thereof. It is also contemplated herein that the anti-harvesting component responsible for the deformation of the security feature when exposed to temperatures above the anti-harvesting temperature may also be in the form of particles distributed, randomly or uniformly, between or across layers, or among interfaces of the security feature, or combinations thereof. In a further embodiment where the anti-harvesting component is in the form of particles, such particles are applied in the formation of the security feature as a dispersion or as an emulsion. The size and concentration of the particles must not interfere with the formation and projection of the one or more synthetic images. In regard to particle size, it is preferred that the size of the particles is in the sub-micron range. In regard to concentration, it is preferred that the concentration of particles occupy less than about 12% (more preferably between about 2 to about 8%) of any cross-sectional area beneath or above the image icon focusing elements.

It is also contemplated within the scope of the present invention that the anti-harvesting component forms a reactant product layer or interface, whereby in response to a thermal attack, components in neighboring or contiguous layers react to form a separate layer or interface that is in turn susceptible to thermal attack to produce a thermal decay. The anti-harvesting component is integrated as a component of the security device such that when the security device is exposed to a thermal attack it causes thermal decay. As used herein, a thermal attack refers to an exposure to a harvesting temperature that is above the anti-harvesting temperature resulting in thermal decay. Likewise a thermal decay includes a structural fracture (i.e., when the structure of the device or label becomes fractured or distorted such as by shrinking or expanding beyond its original size) or the thermal decay can be an optical fracture of the security device whereby the synthetic image of the security device is distorted or destroyed by bringing at least one of the synthetic images out of focus, reducing the number of synthetic images, changing the color, size or shape of the synthetic images or causing one or more synthetic images to disappear.

Figure 2:
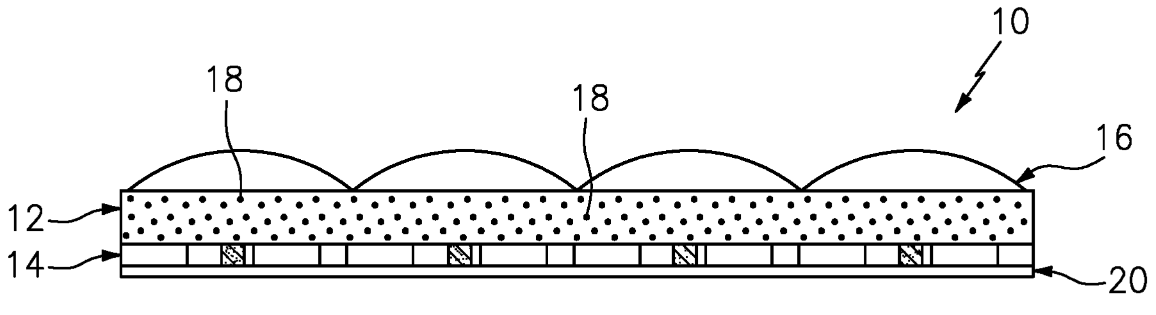
FIG. 2 is a cross-section of another embodiment of the security device, where the anti-harvesting component is optionally coated particles distributed within the optical spacer layer.

In an embodiment where the security feature is a security device, the anti-harvesting temperature is determined by an anti-harvesting component of the security device. It is also contemplated that one or more coupling means may also function as an anti-harvesting component in the form of a layer. A suitable layered or laminated anti-harvesting component is a layer of the device where such layer comprises a material that will thermally decay by irreversibly expand, shrink, melt, turn dark or opaque, or somehow otherwise deform or degrade at or above the anti-harvesting temperature so that the security device is no longer viewable or is obscured. Typically, this material will comprise a continuous layer of the device or as particles distributed in a matrix that comprises a layer of the device. In one specific exemplary embodiment, the anti-harvesting component is a polymeric material that shrinks when exposed to a temperature above the anti-harvesting temperature. For example, in one embodiment the anti-harvesting component is a heat shrink film (e.g., a 2 mil (50 micron) heat shrink film). In another such embodiment, the anti-harvesting component is a thermoformed material formed by heating and expanding the material to a desired shape then rapidly cooling the material such that subsequent heating causes shrinking, preferably non-elastomeric shrinking. The term "non-elastomeric shrinking", as used herein, means that the material does not return to its original expanded state upon cooling. It has been found that non-elastomeric shrinking provides improved thermal decay as the decay becomes less predictable and therefore less susceptible to harvesting. In one embodiment of the security feature, which is shown in FIG. 1 and marked with reference numeral 10, the anti-harvesting component is integrated as an optical spacer 12 disposed between at least one array of image icon elements 14 and at least one array of image icon focusing elements 16 such that the optical spacer 12 provides the anti-harvesting temperature. In this embodiment, the anti-harvesting component may comprise either the optical spacer 12 itself and/or optionally coated particles 18 (e.g., thermally conductive particles or particles coated with a thermally conductive material) distributed on or within this layer (see FIG. 2). More generally speaking, the anti-harvesting component may preferably be a substrate layer disposed between the image icon element array(s) and the image icon focusing element array(s) and either is made up of a thermoformed material, polyethylene terephthalate glycol (PETG), available from Laird Plastics of Ohio, USA, polyethylene terephthalate (PET or PETE), and/or polyvinyl chloride (PVC), or is coated with any one or combination thereof. The anti-harvesting component may also comprise adhesive layer 20 and/or optionally coated particles (not shown) distributed on or within this layer. When the anti-harvesting component is integrated with the security feature as particles, various particles are considered suitable. However, it has been found most suitable to include particles having a high thermal conductivity as such materials increase the heat transfer to the desired location for thermal decay onset. For example, particles having any suitable shape including any rounded shape (e.g., circular, spherical, oval), cylindrical shape (e.g., elongate fibers), irregular shape, random shape, or the like are contemplated and those particles comprising at least one of a copper, aluminum, brass, graphene, graphite or silver material are most suitable. In a further embodiment, where the anti-harvesting component is a particle, it is contemplated that particles comprising at least one of a thermoformed material are preferred. Moreover, particles comprising at least one of PETG, PET or PETE, and PVC, are also contemplated.

Figure 3:
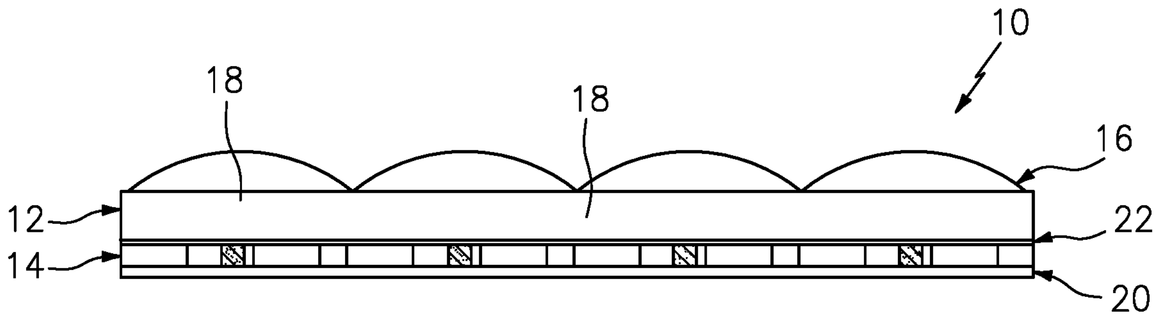
FIG. 3 is a cross-section of yet another embodiment of the security device, where the anti-harvesting component forms a reactant product layer or interface between the optical spacer and image icon element layer.

In an embodiment of the security feature, the anti-harvesting temperature is determined by an anti-harvesting component integrated with the security device or with the security label. In one embodiment, the anti-harvesting component is or forms an interface between layers of the security device, between layers of the security feature, or an interface between the security feature and the secure product. It is also contemplated that one or more coupling means may also function as an anti-harvesting component within an interface. For example, the anti-harvesting component is an interface of the device where the interface comprises a material that will irreversibly expand, shrink, melt, turn dark or opaque, or somehow otherwise deform or degrade the interface at or above the anti-harvesting temperature so that the security device is no longer viewable or is obscured. While not exhaustive, in one embodiment as shown in FIG. 3, the anti-harvesting component forms a reactant product layer or interface 22, whereby in response to a thermal attack, components in neighboring or contiguous layers react to form separate layer or interface 22 that is in turn susceptible to thermal attack to produce a thermal decay. For example, in one embodiment, the interface is created by the chemical or mechanical interaction of two layers to produce an interface either before the harvesting attempt or because of the harvesting attempt where the chemical reaction is catalyzed by the thermal attack. In one such embodiment, the interface is formed when the system is exposed to heat but before the temperature reaches the anti-harvesting temperature. Subsequent exposure at or above the harvesting temperature causes the structural or optical failure of the system. Preferably the thermal attack occurs in two stages where in a first stage the product reactant layer or interface is formed and then subsequent application of the thermal attack causes thermal decay of the product reactant layer or interface. The interface material will comprise a continuous or discontinuous layer of the security feature. In one specific exemplary embodiment, the anti-harvesting component is a polymeric material and causes the interface to shrink when exposed to a temperature above the anti-harvesting temperature.

In an embodiment where the security feature is part of a security label, the anti-harvesting temperature is determined by an anti-harvesting component of the security device as described in the immediately preceding paragraphs. In a further embodiment, the anti-harvesting temperature is alternatively, or additionally, determined by an anti-harvesting component of the label not present in the security device. Suitable anti-harvesting components of the security label include, for example, those described above for the security device, or additionally or alternatively, a layer of the security label, an interface of the security label or particles distributed throughout the security label.

In one embodiment, the anti-harvesting component, when exposed to the stress of harvesting, whether by one of thermal attack, mechanical harvesting, chemical harvesting or another form, will itself, or will cause the security feature to become deformed. The material will either temporarily or permanently deform. In preferred embodiments, the deformation is permanent such that the security feature or the label will irreversibly expand, shrink, melt, or turn dark or opaque or is otherwise thermally decayed.

As used herein, security devices include an array of image icon elements and an array of image icon focusing elements. Suitable image icon elements and image icon focusing elements are described in U.S. Pat. Nos. 7,333,268, 7,468,842, 7,738,175, 8,773,763, 8,867,134, 8,284,492, 8,739,711, 8,755,121, International Patent Application Publication WO2013/028534, International Patent Application Publication WO2014/143980, International Patent Application Publication WO2014/028031, International Patent Application Publication WO2013/112796, International Patent Application Publication WO2014/039476, International Patent Application Publication WO2015/034551, International Patent Application Publication WO2015/179175, International Patent Application Publication WO2014/176251, International Patent Application Publication WO2015/069558 and International Patent Application Publication WO2005/106601 which are each incorporated herein in their entirety.

In one embodiment, the array of image icon elements and array of image icon focusing elements are oriented relative to each other to form a synthetic image. As used herein, a "synthetic image" refers to an image produced by the magnification and composition effects of the focusing elements. The individual focusing elements magnify or cooperate to magnify microimages, or portions thereof, which are present in the array of image icon elements. The focusing elements also cooperate to combine the magnified microimages or portions thereof into a combined magnified image. In preferred embodiments, the microimages, or portions thereof, are not observable with the naked human eye but are observable through magnification by the focusing elements. Moreover, the composite image is preferably not observable with the naked human eye, but is made so observable by the cooperation of the individual focusing elements which compose the magnified microimages, or portions thereof, into at least one synthetic image (i.e., the magnified and composite image). The synthetic image(s) may appear stationary or having motion effects as the microimages are viewed through the focusing elements at different angles or points of view. For example, tilting the security device about an axis can result in the synthetic image(s) changing form, shape, size, color, depth (i.e., in-plane, above plane or below plane of the security device) or any combination(s) thereof.

Another aspect of the invention provides a security feature in the form of a security label comprising a label substrate and a security device. The security device is as described above and is affixed to the label substrate by a second coupling means/element. As used herein, the term "second" in the phrase "second coupling means" is not intended to indicate second in a sequence of coupling means but is rather intended as a distinct identifier, irrespective of any sequential order relative to other coupling means. The security label has a selected anti-harvesting temperature such that when coupled to a product substrate by a first coupling means, the anti-harvesting temperature is lower than the harvesting temperature of the first coupling means. As used herein, the term "first" in the phrase "first coupling means" is not intended to indicate first in a sequence of coupling means but is rather intended as a distinct identifier, irrespective of any sequential order relative to other coupling means. The security label includes an anti-harvesting component that is present either in the security device, another component of the security label (e.g., the label substrate), or both. Suitable anti-harvesting components include layers, interfaces or particles distributed over a single or multiple layer(s) or interface(s) of the security label. Anti-harvesting components suitable for the security label are those described above.

In one embodiment, a suitable label comprises paper and/or polymeric substrates. Paper substrates may comprise one or more cellulosic layers. These and other labels will be apparent to those having ordinary skill in the art.

Another aspect of the invention provides a product comprising a product substrate and a security feature, as described herein, affixed thereto. In one embodiment, the security feature is a security device that is affixed either directly or indirectly to the product. The security device is either directly affixed to the product substrate by a first coupling means or is indirectly affixed to the product substrate. Where the security device is indirectly affixed to the product substrate, various means are contemplated. However, it is preferred that when the security device is indirectly affixed to the product substrate that the security device is affixed by at least a second coupling means to a label substrate of a label and that the label is in turn affixed to the product substrate by a first coupling means. The secured product has a selected anti-harvesting temperature that is lower than the harvesting temperature of the first coupling means, the second coupling means, or both. The secured product includes an anti-harvesting component that is present either in the security device, another component of the security label (e.g., the label substrate), or both.

In one embodiment, a suitable product includes, but is not limited to, electronic devices, clothing and other apparel, pharmaceuticals, and various home and consumer products. These include portable devices such as telephones, computers, cameras and the like. Personal care products such as containers of toothpaste, shampoo, lotions and the like. Other products will be apparent to those having ordinary skill in the art.

In one embodiment, a suitable product substrate includes polymeric or cellulosic materials in layered or laminated form.

Another aspect of the invention provides a method of making the security device, the security label and the secured product. One embodiment of making the security device comprises providing an array of image icon elements and providing an array of image icon focusing elements. The image icon elements and image icon focusing elements are coupled to provide at least one synthetic image, optionally having motion effects. The method further comprises providing an anti-harvesting component and integrating the anti-harvesting component into the security feature. Incorporation of the anti-harvesting component may be by using the anti-harvesting component to form a layer of the security feature (e.g., the optical spacer), laminating a layer of the anti-harvesting component between layers of the security feature. Alternatively, the layers of the security feature comprises elements that form an interface either before application of a harvesting attempt or in response to a harvesting attempt. In another alternative, the anti-harvesting component are in the form of particles distributed across a single layer or interface or distributed over multiple layers or interfaces.

One embodiment of the method of making a security label comprises (1) providing a security device as described herein and a label substrate and (2) affixing the security device to the label substrate, optionally with a second coupling means as described herein.

One embodiment of the method of making a secured product comprises (1) providing a security device as described herein, or a security label as described herein, (2) providing a product having a product substrate, and (3) affixing the security device to the product substrate or affixing the security label to the product substrate. Where the security device is affixed to the product substrate, a first coupling means as described herein may be applied. However, where the security device is indirectly affixed to the product substrate, the security device may be affixed by a coupling means to a label substrate forming a security label, which is in turn affixed to the product substrate by another coupling means.

Another aspect of the invention provides the use of a security device or a security label, as described herein, as an anti-counterfeiting feature. Particularly, what is provided is the use of a security label for the authentication of a product, wherein the security label comprises a label substrate and a security device affixed to the label substrate by a second coupling means, and wherein the security label is affixed to a product substrate of the product by a first coupling means to form a secured product. The secured product provides an obstacle to harvesting. Particularly, in a specific embodiment, the secured product prevents thermal harvesting of the security device of the security label. As such, the security feature (device or label) has an anti-harvesting temperature that is provided by an anti-harvesting component incorporated into the security device or the security label. This improves the authenticity of a secured product as it is less likely for the security device or security label to have been removed from an authentic product and affixed to a counterfeited product.

Applicant has surprisingly found that, by incorporating at least one anti-harvesting component into a security feature described herein, harvesting can be mitigated by preventing, reducing, discouraging or rendering useless the practice of harvesting. While various harvesting techniques are contemplated by the present invention, in one embodiment, the security feature comprises an anti-harvesting component that mitigates thermal harvesting. In an embodiment where the anti-harvesting component mitigates at least against thermal harvesting, the anti-harvesting component provides an anti-harvesting temperature that is lower than a harvesting temperature of the security feature.

The anti-harvesting components, as employed in the various aspects and embodiments of the current invention and this disclosure, causes the security feature to deform when subjected to tampering attempts such as harvesting. For example, attempts to harvest the security feature from a product cause a deformation by means of at least one of a change in opacity of the security device, or change in color or shape of the security feature. Moreover, in one embodiment wherein the security device includes an image icon focusing element or an image icon element, tampering deforms the security feature such that the focal length of the icon focusing element changes. Changes in the focal length can result in destruction or impairment of the focus of the icon focusing element. It is also contemplated within the scope of the present invention that the effects produced by the security feature, such as motion effects, or the synthetic image, will be deformed by destruction or impairment of the motion effect or of the synthetic image. Similarly, it is also contemplated herein that the security feature displays at least one seemingly static image and that the seemingly static image becomes deformed when the security feature is tampered with.

Thermal harvesting can result in at least one deformation that manifests into a change in the shape, texture, color, topography, opacity, focus, motion effect, or synthetic image of the security feature. Changes in shape include the appearance of bubbles or rough patches on the security feature. Applicant has found that with the particular anti-harvesting component(s), these deformations are easily identifiable thereby reducing the likelihood that a harvested security feature could be used to misidentify a counterfeit product. These deformations are readily observable. By this mechanism, the present invention provides a security feature where harvesting, such as thermal harvesting, is mitigated due in part to the deformation produced in the security feature during harvesting activity. In one embodiment, the deformation is due, at least in part, to the presence of an anti-harvesting component that imparts an anti-harvesting temperature that is lower than the harvesting temperature of at least one coupling means of the security feature.

It is of some importance that although a security feature will deform above the anti-harvesting temperature, it should remain intact and not deform through normal processing of security products where the temperatures can range up to 75° C., or up to 85° C. Accordingly, in one embodiment, the current invention comprises a security feature having an anti-harvesting component wherein the anti-harvesting temperature is above the normal processing temperature. As used herein, the term "normal processing" refers to the production, transportation, storage or circulation processes generally employed in for the intended lifecycle of the product, excluding harvesting techniques. In one embodiment, the anti-harvesting temperature is greater than 60° C., greater than 70° C., greater than 75° C., greater than 85° C. In one embodiment, the security feature survives exposure to 90% humidity at 60° C. In another embodiment, the security feature survives 70° C. for up to 24 hours or 60° C. for up to 1 week. In one embodiment, the security feature thermally decays within 5 minutes, 4 minutes, 3 minutes, 2 minutes, 1 minute, 45 seconds, 30 seconds, 15 seconds, 10 seconds, 5 seconds or 1 second of reaching a harvesting temperature of 85° C. or higher, or within all sub-ranges of less than 5 minutes. In another embodiment, the security feature thermally decays when exposed to a thermal attack above 60° C.; between 80° C. and 130° C.; or between 80° C. and 90° C. In one embodiment, the security device is susceptible to a thermal decay when exposed to thermal attack between 80° C. and 130° C.; exposed to a thermal attack at above 60° C. when the humidity is at least 90%; exposed to thermal attack at above 60° C. for at least 1 week; exposed to thermal attack at above 70° C. for at least 24 hours. Preferably the onset of thermal decay of the security feature is within 5 minutes, 4 minutes, 3 minutes, 2 minutes, 1 minute, 45 seconds, 30 seconds, 15 seconds, 10 seconds, 5 seconds or 1 second of a thermal attack; or thermal decay is completed within 5 minutes.

In a further embodiment, the harvesting temperature is greater than 85° C., greater than 90° C., greater than 95° C., or greater than 100° C. The anti-harvesting component provides an anti-harvesting temperature less than 100° C., 95° C., 90° C., or less than 85° C. such that the anti-harvesting temperature is less than the harvesting temperature. Exposure of the security feature to temperatures above the anti-harvesting temperature results in a deformation of the security feature reflected as at least one of a change in shape, texture, color, topography, focus, motion effect, or synthetic image of the security feature.

In one embodiment, the security feature comprises an anti-harvesting component which provides an anti-harvesting temperature that ranges between from 60° C. and 100° C. or any sub-ranges there between including between 75° C. and 85° C.

The invention claimed is:

1. A security device comprising:
- an array of image icon elements; and
- an array of image icon focusing elements,
- wherein the array of image icon elements and the array of image icon focusing elements are disposed relative to each other such that the security device projects a synthetic image when the array of image icon elements is viewed directly or through the array of image icon elements, and
- wherein the security device thermally decays when exposed to temperatures at or above an anti-harvesting temperature, the anti-harvesting temperature being lower than a harvesting temperature of a coupling between the security device and a substrate.

2. The security device of claim 1, comprising an anti-harvesting component integrated with the security device, wherein the anti-harvesting component thermally decays when the security device is exposed to temperatures at or above the anti-harvesting temperature.

3. The security device of claim 1, wherein the anti-harvesting temperature is between about 60° C. and about 90° C.

4. The security device of claim 1, wherein the security device will thermally decay when exposed to temperatures above 60° C.

5. The security device of claim 1, wherein the security device will thermally decay when exposed to temperatures between 80° C. and 130° C.

6. The security device of claim 1, wherein the security device will thermally decay when exposed to temperatures above 60° C. and humidities of at least 90%.

7. The security device of claim 1, wherein the security device will thermally decay when exposed to temperatures above 60° C. for at least 1 week.

8. The security device of claim 1, wherein the security device will thermally decay when exposed to temperatures at above 70° C. for at least 24 hours.

9. The security device of claim 1, wherein the security device will thermally decay within 5 minutes of exposure to temperatures at or above the anti-harvesting temperature.

10. The security device of claim 2, further comprising an optical spacer, wherein the optical spacer comprises the anti-harvesting component.

11. The security device of claim 2, wherein the anti-harvesting component as comprises an interface between layers of the security device.

12. The security device of claim 2, wherein the anti-harvesting component is integrated as a distribution of particles within the security device.

13. The security device of claim 12, wherein particles of the distribution of particles are thermally conductive.

14. The security device of claim 13, wherein the particles are spherical in shape or elongate fibers.

15. The security device of claim 2, wherein the anti-harvesting component comprises one or more of a reactant product layer or a reactant product interface formed from a chemical or mechanical interaction of two or more components of the security device in response to the security device being exposed to temperatures at or above the anti-harvesting temperature.

16. The security device of claim 2, wherein the anti-harvesting component comprises a thermoformed material.

17. The security device of claim 2, wherein the anti-harvesting component comprises one or more of a polyethylene terephthalate (PETE), a polyethylene terephthalate glycol (PETG) or a polyvinyl chloride (PVC).

18. The security device of claim 2, wherein the anti-harvesting component is an optical spacer, the optical spacer comprising one or more of a PETE, PETG and PVC.

19. A security label comprising:

a label substrate; and a security device affixed to a product substrate by a first coupling, the product substrate affixed to the label substrate by a second coupling, and wherein the security label thermally decays when exposed to temperatures at or above an anti-harvesting temperature, and wherein the anti-harvesting temperature is lower than a harvesting temperature of the first coupling.

20. The security label of claim 19, wherein the security label includes an anti-harvesting component integrated with the security label, wherein the anti-harvesting component will thermally decay when the security label is exposed to temperatures at or above the anti-harvesting temperature.

21. The security label of claim 20, wherein the anti-harvesting component comprises a spacer substrate.

22. The security label of claim 20, wherein the anti-harvesting component will thermally decay when exposed to temperatures above 60° C.

23. The security label of claim 20, wherein the anti-harvesting component comprises at least one of a polyethylene terephthalate glycol (PETG), a polyethylene terephthalate (PETE) or a polyvinyl chloride (PVC).

24. The security label of claim 20, comprising an anti-harvesting component will thermally decay of the security label when the security device is exposed to temperatures at or above the anti-harvesting temperature.

25. The security label of claim 20, wherein the anti-harvesting temperature is between about 60° C. and about 90° C.

26. A secure document, comprising:

a product substrate; and a security device affixed to the product substrate by a first coupling, and wherein the security device thermally decays when exposed to temperatures at or above an anti-harvesting temperature, wherein the anti-harvesting temperature is lower than a harvesting temperature of the first coupling.

27. A method of producing a security device, comprising:

providing an array of image icon elements;

providing an array of image icon focusing elements;

providing at least one anti-harvesting component which thermally decays at temperatures at or above an anti-harvesting temperature; and wherein the array of image icon elements and the array of image icon focusing elements are coupled to produce at least one synthetic image.

28. A method of producing a security label, comprising:

providing a security device, the security device comprising an array of image icon elements, and an array of image icon focusing elements, wherein the array of image icon elements and the array of image icon focusing elements are disposed relative to each other such that the security device projects a synthetic image along a viewing angle, and wherein the security device thermally decays when exposed to temperatures at or above an anti-harvesting temperature; and affixing the security device to a label substrate to a label substrate by a first coupling, and wherein the anti-harvesting temperature is lower than a harvesting temperature of the first coupling.

29. The security device of claim 13, wherein the particles comprise at least one or more of copper, aluminum, brass, graphene, graphite or silver.

30. The security device of claim 12, wherein the particles occupy less than 12% of a cross-sectional area beneath or above the array of image icon elements.

31. The security device of claim 1, wherein the security device will thermally decay when exposed to temperatures at or above the anti-harvesting temperature, the thermal decay comprising one or more of a structural fracture of the security device, a change in appearance of the synthetic image projected by the security device, an appearance of bubbles in the security device, an appearance of rough patches in the security device, or a non-elastomeric shrinking of the security device.

32. The security label of claim 19, wherein the label substrate comprises one or more of a paper substrate or a polymeric substrate.

* * * * *